H. M. MITCHELL.
MOTOR LIFT-OUT DEVICE.
APPLICATION FILED JULY 31, 1916.
1,228,947.
Patented June 5, 1917.
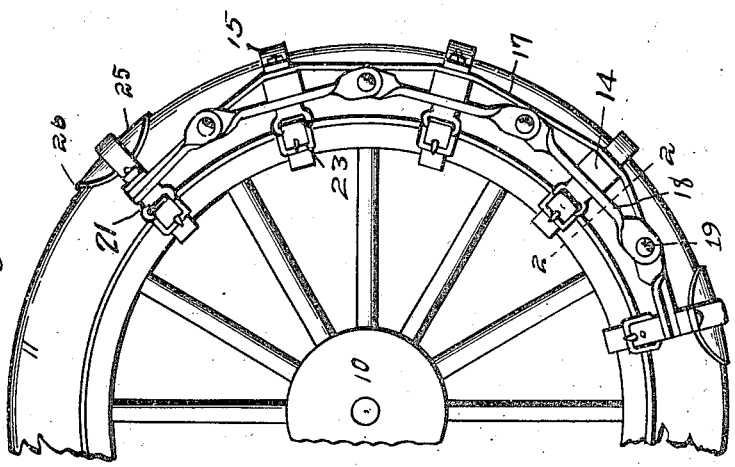
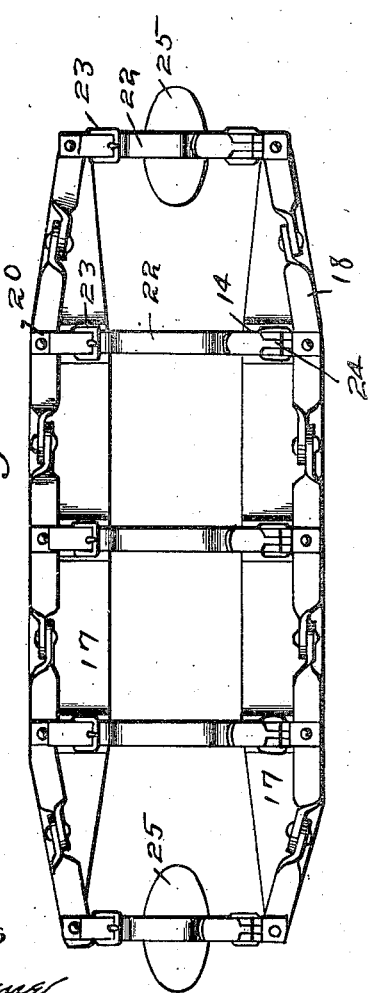
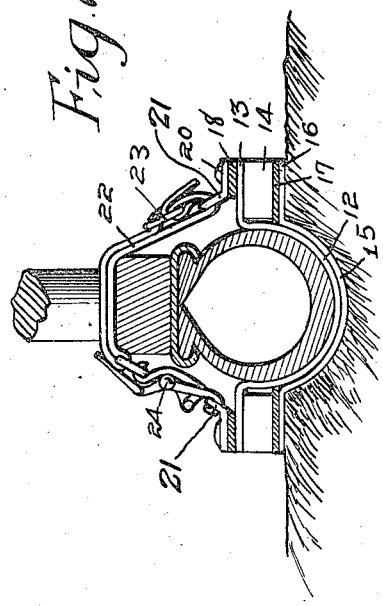
Witness
A. J. Hague.
Inventor
Hugh M. Mitchell
by Orwig & Bair attys.

UNITED STATES PATENT OFFICE.

HUGH M. MITCHELL, OF DES MOINES, IOWA, ASSIGNOR TO WILLIAM B. MITCHELL, SR., OF DES MOINES, IOWA.

MOTOR-LIFT-OUT DEVICE.

1,228,947.

Specification of Letters Patent. Patented June 5, 1917.

Application filed July 31, 1916. Serial No. 112,420.

*To all whom it may concern:*

Be it known that I, HUGH M. MITCHELL, a citizen of the United States, and resident of Des Moines, in the county of Polk and State of Iowa, have invented a certain new and useful Motor-Lift-Out Device, of which the following is a specification.

The object of my invention is to provide an automobile lift out in the nature of a device adapted to be attached to the wheels of a motor vehicle for giving the same greater gripping power, whereby an automobile may be driven out of a mud hole or the like under its own power.

A further object is to provide an attachment of the kind mentioned of simple, durable and inexpensive construction.

Still a further object is to provide such a device adapted to be readily and easily attached to or removed from the wheels of a motor vehicle and including traction devices of considerably greater width than the ordinary automobile tire or wheel tread, whereby for such purposes the automobile wheels may be given a broad tread adapted to move the vehicle forward even in sand or mud.

My invention consists in the construction, arrangement and combination of the various parts of the device, whereby the objects contemplated are attained, as hereinafter more fully set forth, pointed out in my claims and illustrated in the accompanying drawings, in which:—

Figure 1 shows a side elevation of a part of a motor vehicle traction wheel equipped with a section of a lift out device embodying my invention.

Fig. 2 shows a detail, sectional view taken on the line 2—2 of Fig. 1.

Fig. 3 shows a top or plan view of a section of my improved lift out device laid out on the ground.

In the accompanying drawings, I have used the reference numeral 10 to indicate an ordinary motor vehicle wheel having a pneumatic tire 11.

In Fig. 1 I have shown a section of my improved lift out device on the wheel. It will readily be understood that two or more sections can be used or that the length of a section may be varied so that a single section of the device may be made to extend entirely around the wheel.

My improved device includes a plurality of spaced semi-circular yokes or strips of metal 12 extending transversely across the tread portion of the tire 11. At their ends, the yokes 12 are provided with laterally extending arms 13, as clearly shown in Fig. 2.

Secured to the outer surfaces of the arms 13 are blocks 14. Secured to and fitted to the outer surfaces of the yokes 12 are yokes 15 similar in form but shorter, having at their outer ends laterally extending arms 16, spaced from and parallel with the respective arms 13 and secured to the blocks 14 on the opposite sides thereof from the arms 13.

Extending alongside the tire on each side thereof, is a strip of flexible material 17 such as belting or the like secured to the block 14 between said block and the arm 16. The blocks 14 are also connected on each side of the tire by the following means:

Secured to each arm 13 is a strip of metal 18, extending in opposite directions from the arms 13, approximately half way to the adjacent arm 13 on the same side of the tire, as shown in Fig. 1. The ends of the strips 18 are successively pivoted together around the tire at 19. These strips 18 serve to hold the block 14 and the yokes 12 and 15 properly spaced from each other and also to support the flexible strip 17 when the device is being used in the mud.

Suitably fixed with relation to the block 14 is a small plate 20 on which is a loop 21 inclined toward the rim of the wheel. It is of course obvious that the plates 20 are arranged in pairs on opposite sides of the tire.

Through one loop 21 of one plate 20 of each pair is extended a flexible device such as a leather strap 22. The strap 22 is formed into a loop or endless member by means of a buckle 23 fixed to one end of the strap and adapted to be adjustably secured to the other end of the strap. By means of the buckle 23 the length of the loop formed by the strap may be regulated. The strap 22 is designed to fit over the rim of the wheel as clearly shown in Figs. 1 and 2.

Secured to the opposite end of the loop formed by the strap 22 farthest away from the plate 20 to which said strap is secured, is a locking hook 24 of any suitable form, one ordinary form commonly found on the market being shown. The hook 24 may be secured to the loop 21 of the plate 20 on the opposite side of the tire to the plate 20 to which the strap 22 is secured.

If the section of my device should be applied on the wheel when the wheel is in the mud, then as the wheel turns, the traction surface will be increased somewhat gradually instead of all at once. Where the lift out is made in sections, as just mentioned, there is secured to the inner surface of each yoke 12 at the end of the lift out section, a plate 25 having its inner surfaces shaped to conform to the outer surface of the tread portion of the tire.

On the inner or under surface of each plate 25 is a lining 26 of leather or the like adapted to engage the surface of the tire and to prevent cutting of the tire by the metal of the plate 25.

In the practical use of my improved lift out device, the device is mounted on the traction wheel of the motor vehicle in the manner hereinbefore described.

The device is preferably not used except in bad mud or sand.

After my improved device has been installed on the automobile traction wheels, and the engine is started, it will be seen that my device offers a broad surface somewhat similar to the traction wheels of a traction engine, and a good deal broader from side to side than the traction surface offered by the ordinary automobile tire.

In this connection it will be noted that the blocks 14 at the ends of the section are preferably smaller than the other blocks and the arms 13 and 16 at the ends of the section are preferably shorter than the other arms 13 and 16 and that the strips 17 are somewhat tapered at their ends. On account of this construction the increase in traction surface is made gradual.

Where my improved device is used the machine has all of the ordinary traction surface and in addition the yokes 12 and 15 and the flexible strips 11 afford gripping surface.

In this connection attention is called to the use of the curved yokes 12 and 15, whereby the laterally extending parts of my improved lift out device are located inwardly on the wheels from the central tread of the tire, so that they do not interfere with and are not interfered with by the fenders on the machine, as would be the case if the arms 16 extended laterally and were flush with the extreme central tread portion of the tire.

I have had my improved lift out device in use and have found that it affords sufficient gripping or traction surface that an ordinary motor vehicle can carry itself through very bad sand or mud.

In fact with my improved device the machine will travel in mud as long as the chassis can be kept clear from the surface of the mud. As many sections as desired may be used.

It will be noted that on account of the fact that many of the parts of my improved device are flexible, and on account of the pivotal connections of the members the lift out device may be folded into a very small space for transportation or storage.

Numerous changes may be made in the construction, and arrangement of the parts of my improved lift out device without departing from the essential features and purposes thereof, and it is my intention to cover by this application any such changes which may be included within the scope of my claims:

I claim as my invention:

1. In a motor lift out, a series of pairs of spaced parallel yokes adapted to extend across a tire and having laterally extending ends, the yokes of each pair being disposed one above the other and their ends being spaced from each other, a strip of pliable material extended between the said ends at each side of the tire, means for clamping said ends against the flexible strip, and means for securing said device to a wheel.

2. In a motor lift out, a series of pairs of spaced parallel yokes adapted to extend across a tire, and having laterally extended ends, a strip of pliable material extended between and secured to such ends, said strip being of greater width at its intermediate portions than at its ends.

Des Moines, Iowa, July 22, 1916.

HUGH M. MITCHELL.